US005902775A

United States Patent [19]
Thorssen et al.

[11] Patent Number: 5,902,775

[45] Date of Patent: May 11, 1999

[54] OIL AND GAS WELL OPERATION FLUID USED FOR THE SOLVATION OF WAXES AND ASPHALTENES, AND METHOD OF USE THEREOF

[75] Inventors: Donald A. Thorssen; Dwight N. Loree, both of Calgary, Canada

[73] Assignee: Trysol Ltd., Calgary, Canada

[21] Appl. No.: 09/133,385

[22] Filed: Aug. 13, 1998

Related U.S. Application Data

[62] Division of application No. 08/650,656, May 20, 1996, Pat. No. 5,795,850, which is a continuation of application No. 08/195,993, Feb. 14, 1994, abandoned.

[30] Foreign Application Priority Data

Feb. 24, 1993 [CA] Canada .................................. 2090306

[51] Int. Cl.[6] .............................. C09K 3/00; B08B 7/00

[52] U.S. Cl. ......................... 507/90; 507/203; 134/22.14; 134/22.19; 134/40; 166/304; 166/311

[58] Field of Search ................. 507/90, 203; 134/22.14, 134/22.19; 166/304, 311

[56] References Cited

U.S. PATENT DOCUMENTS

| | | | |
|---|---|---|---|
| 2,753,939 | 7/1956 | Carpenter et al. | 507/90 |
| 2,937,112 | 5/1960 | Boyer | 134/40 |
| 3,436,263 | 4/1969 | Strenkert | 134/22.14 |
| 3,689,319 | 9/1972 | Sample, Jr. et al. | 134/40 |
| 3,914,132 | 10/1975 | Sutton | 134/40 |
| 4,108,681 | 8/1978 | Lawson et al. | 134/40 |
| 4,414,035 | 11/1983 | Newberry et al. | 134/40 |
| 4,646,837 | 3/1987 | Kruka | 166/304 |
| 4,734,215 | 3/1988 | Prigge | 134/40 |
| 4,755,230 | 7/1988 | Ashton et al. | 507/90 |
| 4,925,497 | 5/1990 | Thierheimer et al. | 134/40 |
| 5,183,581 | 2/1993 | Khalil et al. | 507/90 |
| 5,389,156 | 2/1995 | Mehta et al. | 134/22.19 |
| 5,425,814 | 6/1995 | Krajicek et al. | 134/22.14 |
| 5,484,488 | 1/1996 | Hart et al. | 134/40 |
| 5,504,063 | 4/1996 | Becker et al. | 134/40 |

*Primary Examiner*—Philip Tucker
*Attorney, Agent, or Firm*—Christensen O'Connor Johnson & Kindness PLLC

[57] ABSTRACT

A wax and asphaltene solvation fluid for use in oil and gas wells is derived as a residual fluid from a feedstock that includes a greater mass percentage of trimethylbenzene than decane, and is preferably sour. Mass percentage of both aromatics and asphaltenes in the residual fluid is in the 30%–70% range, and a complex mixture of both is described.

15 Claims, 4 Drawing Sheets

3.202 $iC_4$
3.912 $nC_4$
5.784 $iC_5$
6.514 $nC_5$
7.492 CYCLOPENTANE
9.377 $C_6$
10.097 METHYL CYCLOPENTANE
10.752 BENZENE
11.012 CYCLOHEXANE
12.062 $C_7$
12.688 METHYL CYCLOHEXANE
13.554 TOLUENE
14.505 $C_8$
15.759 M+P XYLENE
16.00 M+P XYLENE
16.504 OXYLENE
16.742 $C_9$
18.660 TRIMETHYL BENZENE
18.800 $C_{10}$
20.701 $C_{11}$

OIL AND GAS WELL OPERATION FLUID USED FOR THE SOLVATION OF WAXES AND ASPHALTENES, AND METHOD OF USE THEREOF

CROSS REFERENCE TO RELATED APPLICATIONS

The present application is a divisional of prior U.S. application Ser. No. 08/650,656, filed May 20, 1996, now U.S. Pat. No. 5,795,850 which is a continuation of U.S. application Ser. No. 08/195,993, filed on Feb. 14, 1994 now abandoned, the benefit of the filing dates which are hereby claimed under 35 USC § 120, and the disclosure of which is hereby expressly incorporated by reference.

FIELD OF THE INVENTION

This invention relates to oil and gas well operation fluids, particularly those used for the removal of contaminants from wells.

BACKGROUND AND SUMMARY OF THE INVENTION

The rocks that contain oil and gas in oil and gas reservoirs are porous and to remove the oil or gas from the reservoirs requires that the oil or gas move through the pores in the rock. If the pores are blocked, then it is difficult and it may even become impossible to remove the oil or gas from the reservoir, with consequent economic loss to the oil or gas well owner.

Two notorious contaminants that may block the pores are waxes and asphaltenes. A wax is normally defined as a hydrocarbon that is a solid at room temperature and has 20 carbon atoms or more. An asphaltene is an agglomerate of aromatic hydrocarbons, and may contain bound oxygen, nitrogen and sulphur atoms. The oil and gas in many, if not most, reservoirs contains both waxes and asphaltenes. These waxes and asphaltenes may be dissolved in the oil. In some cases, however, the waxes and asphaltenes may partially block the pores, or, as production continues, the very action of removing oil from a reservoir may cause waxes and asphaltenes to precipitate out of solution and block the pores.

Also, the waxes and asphaltenes may precipitate out of solution in the well bore itself, or in equipment used for the production of oil and gas and reduce or block the flow of oil from the well.

The economic damage from waxes and asphaltene precipitation can be very high, killing some wells entirely. Consequently, a great deal of attention has been devoted to developing cost effective ways of preventing waxes and asphaltenes from precipitating out of solution or of removing the waxes and asphaltenes from an oil reservoir or well bore.

One such attempt at a solution has been to apply to a well a mixture of a significant proportion of the aromatic xylene (about 45%) and a lesser proportion of the paraffinic hydrocarbon hexane (about 30%), together with about 25% methanol. This product is known by the name NP760 and is available from Wellchem of Calgary, Alberta, Canada. The xylene is intended to solvate asphaltenes and the hexane is intended to solvate waxes. The xylene and hexane components of the composition are each derived from refining a feedstock and removing that particular component from the feedstock. The result is a product that has moderate success in solvating at least some waxes and asphaltenes, but because the fluid is made from a complex process, the fluid is relatively expensive.

One difficulty with the use of hexane or other alkanes is that they tend to cause asphaltenes to precipitate out of solution. This in turn is believed to increase the precipitation of waxes. How this is believed to occur is as follows. Waxes require nucleation sites in the oil formation or well bore to which they can attach. Any such site will become a nucleation site for the further accretion of waxes. In time, the waxes, mixed with asphaltenes, build outward and block the well bore or pores in the formation. In a typical oil formation water surrounds the rock in the formation and waxes will tend to slide off the water and not attach to the rock. However, if asphaltenes are present, they may attach to the rock surface since reservoir rock contains positively and negatively charged molecules (cations and anions) which attract the polar asphaltenes. The asphaltenes may then protrude beyond the water layer surrounding the rock particle and form a nucleation site for waxes. Hence a precondition for wax deposition is the precipitation of asphaltenes from the oil in the reservoir. It is the hexane that causes the precipitation of the asphaltenes and thus the formation of nucleation sites for waxes. The xylene is added to solvate the asphaltenes and prevent the formation of nucleation sites.

However, such a product, formed of an alkane (particularly pentane, hexane and heptane) and an aromatic, and similar products that are produced by the steps of: (a) refining a feedstock, (b) selectively removing hydrocarbons and (c) subsequently mixing the selected hydrocarbons, are not believed very effective in removing gummy layers of waxes and asphaltenes that are typically found in oil and gas reservoirs and well bores in relation to their cost. The waxy depositions in oil and gas formations are complex aggregations of molecules, with many layers and globules of different waxes and asphaltenes, which the inventors have found are not readily removed by simple compositions. Such products, requiring several processing steps, tend to be expensive. Also, in some wells such mixtures of an aromatic, alkane and alcohol or other polar substance may increase the precipitation of waxes and asphaltenes. Thus for example, in the general case, stabilized $C_5$+ condensates tend to precipitate asphaltenes, with the future risk of wax contamination for the reasons just mentioned. That is to say, while it is possible to tailor a particular composition of alkanes and aromatics to a particular well formation, such a procedure is relatively expensive and may produce a product that is useful for one well formation but not for another. With the expense of the product and the risk of actually damaging the well, the application of such a product to a well is a venture not lightly undertaken.

The inventors have found a composition and a method for its use that helps to remove the uncertainty from applying wax solvating materials to wells, while at the same time significantly reducing the cost of making and using the composition. The composition is formed from a complex mixture of aromatics and alkanes (preferably $C_7$+). The complex mixture provides different components that solvate different waxes and asphaltenes. Rather than using a composition derived from selecting individual components during refining, the composition is the residue after lighter hydrocarbon components (preferably substantially all $C_1$, $C_2$, $C_3$, $C_4$ and $C_5$ hydrocarbons) have been removed during refining. With the appropriate selection of the feedstock, an improved wax solvating and asphaltene solvating composition may be derived.

The feedstock should be selected to have a significant proportion of aromatics and alkanes. The inventors have found that if a feedstock has a mass percentage of trimethylbenzene higher than the mass percentage of n-decane as determined by gas chromatography then the feedstock will have a sufficiently complex mixture of aromatics and alkanes for the efficient solvating of asphaltenes and waxes, particularly after the lighter ends ($C_1$, $C_2$, $C_3$, $C_4$ and $C_5$ hydrocarbons) have been removed by distillation from the feedstock. By a sufficiently complex mixture of aromatics is meant aromatics other than, but not necessarily excluding, the simple aromatics benzene, toluene, ethylbenzene and xylene. These simple aromatics are the aromatics normally measured in gas chromatography since they usually yield well defined peaks. The inventors have found that it is necessary to have a good quantity of other aromatics, and the presence of these other aromatics is indicated by the quantity of trimethylbenzene.

Another indication that a feedstock contains a suitably complex blend of aromatics and alkanes to solvate complex gummy layers of waxes and asphaltenes is the presence of sulphur containing compounds in the feedstock. It is believed that sulphur is a catalyst for the conversion of alkanes to aromatics during the many years that the hydrocarbon deposit evolves underground. Hence, the more sulphur, the greater the conversion of alkanes to aromatics. Thus the presence of sulphur is an indication that the feedstock will have a suitable proportion of aromatics to alkanes.

Aromatic composition and alkane composition should be in the range 30% to 70% by mass percentage as determined by gas chromatography for a suitable composition. However, it is not believed that such a range of aromatics and alkanes is sufficient: the composition must be suitably complex as noted above. Further, it has been found desirable that the feedstock be clear or have a light colour such as amber. Dark colour indicates the presence of heavy ends ($C_{16}$+) that assist in the formation of waxes. The $C_{16}$+ content of the fluid should preferably be below 2% by mass as determined by gas chromatography. If the feedstock contains greater than 2% $C_{16}$+ content, then an additional cut may be taken to remove all or substantially all the higher ends.

Alternatively, the fluid may be formulated for pure asphaltene solvation. Pure asphaltene generally occurs in only two situations in the reservoir. In one case, pyrobitumen can be present in gas reservoirs. This is generally believed to have been deposited long ago when oil which had occupied the reservoir migrated out and left the pyrobitumen behind. This pyrobitumen can move during production and plug the formation or wellbore.

Another case is in tertiary recovery using hydrocarbon miscible solvents floods. Light hydrocarbons in the $C_2$ to $C_5$ hydrocarbons range are injected into the reservoir to push the oil to production wells. While these light hydrocarbons will solvate paraffinic molecules they act to precipitate asphaltenic molecules. Thus asphaltene will precipitate without heavy paraffinic molecules present.

The fluid is formulated for solvating pure asphaltenes by increasing the temperature of the cutpoint. This removes the $C_6$ and $C_7$ components which contain a lower percentage of aromatics than the bulk residue. The aromatics in this region are small and not as effective as the more complex aromatics in the remainder of the fluid.

Asphaltenes are normally colloidally suspended in crude oil by peptizing resins (maltenes). These peptizing resins are aromatic and polar at one end and paraffinic or neutral at the other end. The polar end is attracted to the asphaltene and the nonpolar end to the crude oil. When the solid asphaltene is completely surrounded by peptizing resins it becomes a colloidally suspended particle completely suspended in the crude oil.

Currently the main way of treating these precipitations is by injecting pure xylene down a well. Xylene is a simple aromatic with short paraffinic side chains. The more complex aromatics in the $C_8$+ fluid described here with longer side chains provide superior emulation of the maltenes that originally suspended the asphaltene molecules than just pure xylene.

BRIEF DESCRIPTION OF THE DRAWINGS

The present invention will be better understood in conjunction with the appended drawings in which.

DETAILED DESCRIPTION OF THE PREFERRED EMBODIMENT

As used in this present application: a residual fluid is a fluid that remains after light hydrocarbon components (particularly $C_1$, $C_2$, $C_3$, $C_4$ and $C_5$ hydrocarbon components) of a hydrocarbon feedstock are removed during the refining of the hydrocarbon feedstock; a hydrocarbon feedstock is a hydrocarbon fluid that has been produced directly from an oil or gas bearing formation; sour means sulphur containing. $C_n$+ indicates no greater than a small percentage (less than 5%) of $C_1$, $C_2$, . . . $C_{n-1}$.

The preferred composition is a residual hydrocarbon fluid derived from a hydrocarbon feedstock having a complex mixture of aromatics. Complex in this context means that there are included in the mixture aromatics other than benzene, toluene, ethylbenzene and xylene, such as methylethylbenzene, diethylbenzene and propylethylbenzene, to name but a few of the possibilities, although the mixture may also include the simple aromatics. The hydrocarbon feedstock from which the fluid according to the invention is derived should contain a greater percentage of trimethylbenzene than n-decane, in which case it is believed that the fluid will have the desirable wax and asphaltene solvating properties. It should be noted that these aromatics, other than benzene, toluene, ethylbenzene and xylene, are not readily identifiable using gas chromatography, and so having the trimethylbenzene peak higher than n-decane is the manner in which the appropriate feedstock may be identified. According to one aspect of the invention, the feedstock is preferably but not necessarily refined to remove essentially all $C_1$, $C_2$, $C_3$, $C_4$ and $C_5$ hydrocarbon components. It is not necessary that the feedstock have a relatively low ratio of alkanes if the alkanes are concentrated in the lighter ends and the lighter ends are removed by distillation. The feedstock is preferably sour and clear or light amber, with sulphur content exceeding 1500 ppm, and preferably has no more than about 2% $C_{16}$+. In general, it is believed that the more sulphonated the feedstock, the better for asphaltene solvation. If the $C_{16}$+ content is greater than 2%, a further cut should preferably be taken to remove the higher ends.

Figure 1:
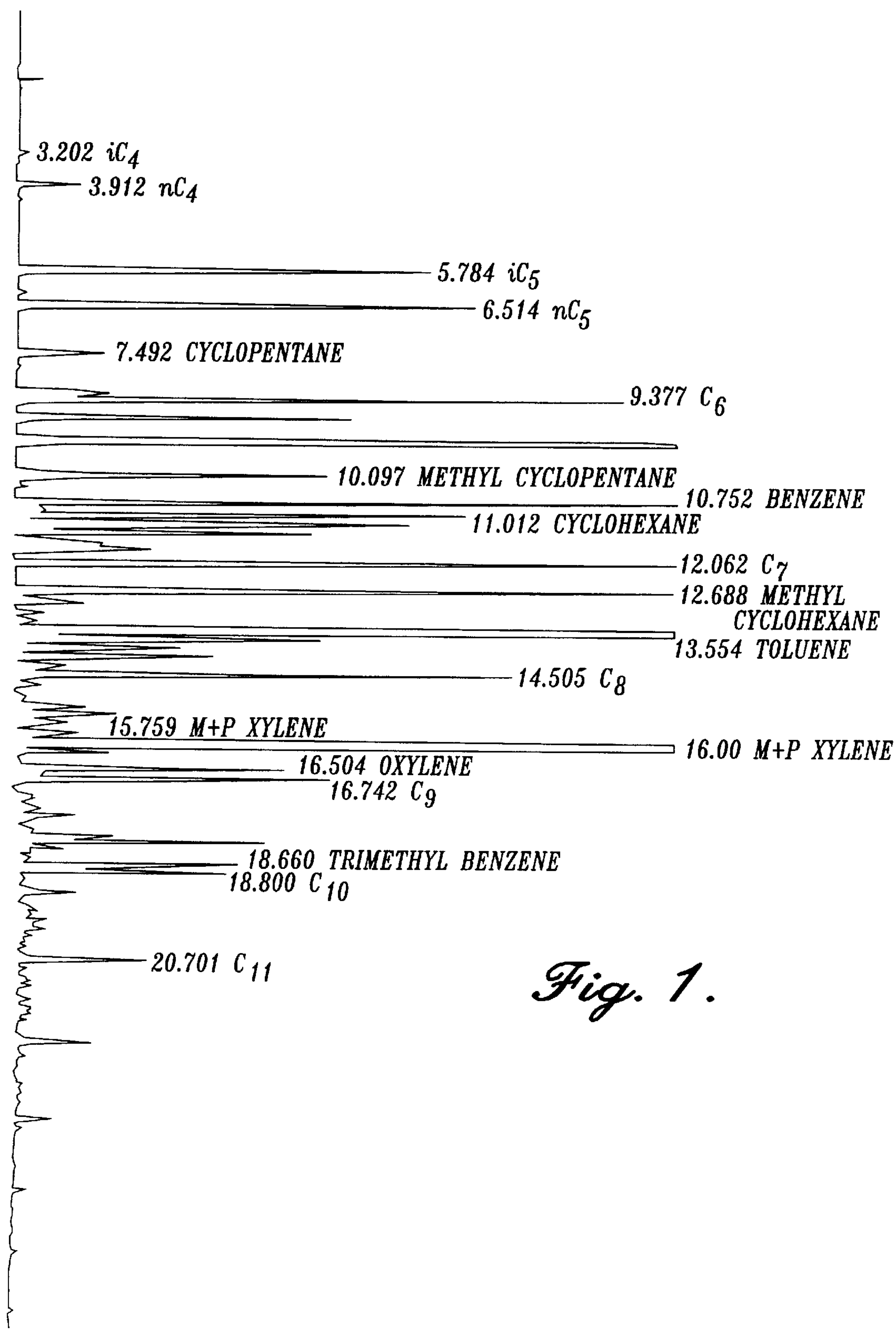
FIG. 1 is a gas chromatograph profile of a $C_5$+ feed from the Wildcat Hills Plant in Alberta, Canada, which is a preferred composition of the present invention.
Figure 2:
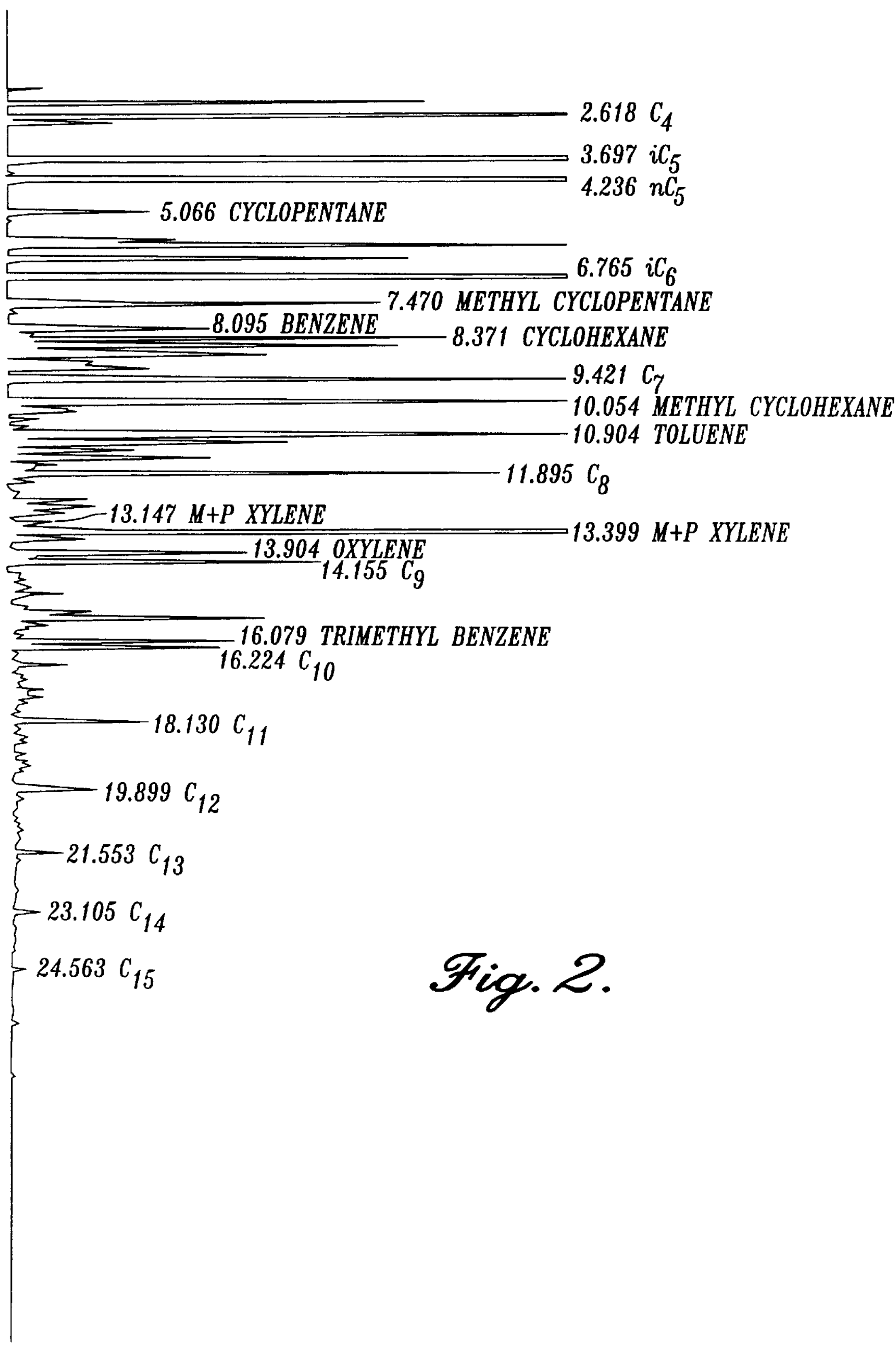
FIG. 2 is a gas chromatograph profile of a $C_5$+ feed from the Jumping Pound Plant in Alberta, Canada, which is an alternate preferred composition of the present invention.

FIGS. 1 and 2 are gas chromatographic profiles (graphic and numerical) of preferred compositions of the feedstock from which the fluid according to the invention may be derived. FIG. 1 is a gas chromatograph profile of the $C_5$+ feed from the Wildcat Hills plant in Alberta, Canada. FIG. 2 is a gas chromatograph profile of the $C_5$+ feed from the Jumping Pound plant in Alberta, Canada. The trimethylbenzene marker is indicated at 10 and the n-decane marker is indicated at 12 in each FIGURE.

Tables 1 and 2 are numerical representations of the chromatographs of FIGS. 1 and 2, respectively.

TABLE 1

WILDCAT HILLS

| RT | AREA % | NAME |
|---|---|---|
| 3.202 | .07508 | iC4 |
| 3.912 | .35699 | nC4 |
| 5.784 | 2.69133 | iC5 |
| 6.514 | 2.72246 | nC5 |
| 7.492 | .67313 | Cyclopentane |
| 8.340 | .89997 | |
| 8.487 | 3.99820 | |
| 8.875 | 2.17882 | |
| 9.377 | 6.74750 | C6 |
| 10.097 | 2.47707 | Methyl cyclopentane |
| 10.340 | .08951 | |
| 10.752 | 3.93949 | Benzene |
| 10.887 | .18034 | |
| 11.012 | 2.71677 | Cyclohexane |
| 11.201 | 2.88368 | |
| 11.428 | 2.21393 | |
| 11.641 | .47199 | |
| 11.774 | 1.38668 | |
| 12.062 | 4.72465 | C7 |
| 12.688 | 6.65060 | Methyl cyclohexane |
| 12.910 | .72919 | |
| 13.125 | .22715 | |
| 13.313 | .18384 | |
| 13.554 | 12.71929 | Toluene |
| 13.710 | 2.10055 | |
| 13.900 | 1.04831 | |
| 14.090 | 1.44920 | |
| 14.287 | .47715 | |
| 14.505 | 3.13432 | C8 |
| 14.716 | .17785 | |
| 14.970 | .09517 | |
| 15.048 | .08244 | |
| 15.195 | .49210 | |
| 15.370 | .75489 | |
| 15.510 | .46649 | |
| 15.759 | .45354 | m + p xylene |
| 16.000 | 10.08547 | m + p xylene |
| 16.157 | .54391 | |
| 16.504 | 1.51593 | oxylene |
| 16.615 | .14003 | |
| 16.742 | 1.95847 | C9 |
| 17.068 | .12964 | |
| 17.161 | .14645 | |
| 17.366 | .27271 | |
| 17.508 | .58216 | |
| 17.822 | .17800 | |
| 17.946 | .79982 | |
| 18.105 | 1.68490 | |
| 18.245 | .29447 | |
| 18.347 | .13771 | |
| 18.493 | .12346 | |
| 18.660 | 1.32512 | trimethyl benzene |
| 18.800 | 1.26158 | C10 |
| 18.965 | .11433 | |
| 19.256 | .53542 | |

TABLE 1-continued

WILDCAT HILLS

| RT | AREA % | NAME |
|---|---|---|
| 19.382 | .07666 | |
| 19.525 | .11942 | |
| 19.616 | .15763 | |
| 19.746 | .13944 | |
| 19.856 | .32040 | |
| 20.044 | .31498 | |
| 20.180 | .13753 | |
| 20.279 | .10719 | |
| 20.420 | .10568 | |
| 20.701 | .94819 | C11 |
| 20.885 | .15028 | |
| 21.060 | .11153 | |
| 21.140 | .11705 | |
| 21.250 | .14451 | |
| 21.545 | .19119 | |
| 21.732 | .20552 | |
| 21.853 | .13484 | |
| 21.980 | .11113 | |
| 22.466 | .63371 | C12 |
| 22.653 | .05706 | |
| 22.740 | .11454 | |
| 23.247 | .06810 | |
| 23.367 | .09962 | |
| 23.543 | .12426 | |
| 23.749 | .08606 | |
| 23.866 | .06625 | |
| 24.119 | .28868 | C13 |
| 24.306 | .10446 | |
| 25.387 | .05999 | |
| 25.668 | .13514 | C14 |
| 27.125 | .06827 | C15 |

TABLE 2

JUMPING POND

| RT | AREA % | NAME |
|---|---|---|
| 2.341 | .97890 | |
| 2.618 | .86497 | C4 |
| 2.816 | .3861 | |
| 3.697 | 14.33011 | iC5 |
| 4.236 | 10.12231 | nC5 |
| 5.066 | .76730 | Cyclopentene |
| 5.784 | .93620 | |
| 5.928 | 4.10632 | |
| 6.290 | 1.97614 | |
| 6.765 | 7.04991 | iC6 |
| 7.470 | 2.18292 | Methyl cyclopentane |
| 8.095 | .89846 | Benzene |
| 8.240 | .13707 | |
| 8.371 | 2.14099 | Cyclohexane |
| 8.551 | 2.20204 | |
| 8.775 | 1.54438 | |
| 8.995 | .35825 | |
| 9.129 | 1.05C50 | |
| 9.421 | 3.83012 | C7 |
| 10.054 | 5.15676 | Methyl cyclohexane |
| 10.274 | .55886 | |
| 10.488 | .16983 | |
| 10.675 | .13411 | |
| 10.904 | 5.37600 | Toluene |
| 11.082 | 1.53461 | |
| 11.277 | .64754 | |
| 11.465 | 1.21631 | |
| 11.660 | .25546 | |
| 11.739 | .10947 | |
| 11.895 | 2.41510 | C8 |
| 12.101 | .14885 | |
| 12.358 | .07718 | |
| 12.588 | .41137 | |
| 12.760 | .53539 | |

TABLE 2-continued

| JUMPING POND | | |
|---|---|---|
| RT | AREA % | NAME |
| 12.899 | .41128 | |
| 13.147 | .27011 | m + p xylene |
| 13.399 | 6.57036 | m + p xylene |
| 13.560 | .39226 | |
| 13.904 | 1.23017 | oxylene |
| 14.155 | 1.50142 | C9 |
| 14.471 | .08211 | |
| 14.569 | .10035 | |
| 14.774 | .18688 | |
| 14.917 | .40929 | |
| 15.237 | .13187 | |
| 15.355 | .50748 | |
| 15.520 | 1.27618 | |
| 15.663 | .19968 | |
| 15.758 | .09574 | |
| 15.909 | .10972 | |
| 16.079 | 1.01203 | trimethyl benzene |
| 16.224 | .96784 | C10 |
| 16.379 | .08264 | |
| 16.674 | .36803 | |
| 16.943 | .07889 | |
| 17.033 | .10599 | |
| 17.160 | .08998 | |
| 17.275 | .21482 | |
| 17.469 | .23662 | |
| 17.602 | .09868 | |
| 18.130 | .64582 | C11 |
| 18.300 | .09683 | |
| 18.485 | .07766 | |
| 18.561 | .08832 | |
| 18.669 | .09555 | |
| 18.966 | .12143 | |
| 19.155 | .13286 | |
| 19.281 | .11464 | |
| 19.405 | .07735 | |
| 19.899 | .48104 | C12 |
| 20.168 | .07798 | |
| 20.974 | .10136 | |
| 21.553 | .25211 | C13 |
| 21.733 | .08036 | |
| 23.105 | .14083 | C14 |
| 24.563 | .07604 | C15 |

To produce the formulation of the invention from the feedstocks shown in FIGS. 1 and 2, the feedstocks are refined to remove substantially all of the $C_1$, $C_2$, $C_3$, $C_4$ and $C_5$ hydrocarbon components, with a small percentage of $C_6$, $C_7$ and $C_8$ hydrocarbons.

With a 120° C. cut, the resulting fluid, as determined by gas chromatography, has about 0.1% pentane, 7% hexanes, 13% heptanes, 13% octanes, 7% nonanes, 9% decanes, 5% undecanes, 3% dodecanes, 2% tridecanes, 1% tetradecanes, 0.6% pentadecanes, 0.3% hexadecanes, 0.1% heptadecanes, 0.05% octadecanes, 1% benzene, 9% toluene, 12% ethyl benzene and meta- and para xylene, 2.6% orthoxylene, 2.2% 1,2,4 trimethylbenzene, 0.1% cyclopentane, 2% methylcyclopentane, 2.6% cyclohexane, 8% methylcyclohexane and less than 0.05% of any other constituent, including cumulatively less than 0.1% $C_{19}$+. Naphthene content is greater than about 3%.

With a 130° C. cut, the resulting fluid, as determined by gas chromatography, has about 0% pentanes, 2% hexanes, 13% heptanes, 13% octanes, 7% nonanes, 9% decanes, 5% undecanes, 3% dodecanes, 2% tridecanes, 1% tetradecanes, 0.5% pentadecanes, 0.2% hexadecanes, 0.1% heptadecanes, 0.05% octadecanes, 1.5% benzene, 12.6% toluene, 15% ethyl benzene and meta- and para xylene, 2.4% orthoxylene, 2.2% 1,2,4 trimethylbenzene, 0% cyclopentanes, 1% methylcyclopentane, 1.9% cyclohexane, 7.8% methylcyclohexane and less than 0.05% of any other constituent, including cumulatively less than 0.1% $C_{19}$+. It will be observed that with the higher cut, all of the remaining pentane, and more than ⅔ of the hexanes have been removed while the aromatic content has increased.

With a 140° C. cut, the resulting fluid, as determined by gas chromatography, has about 0% pentanes, 0.3% hexanes, 8.7% heptanes, 13.5% octanes, 6.7% nonanes, 10.7% decanes, 6% undecanes, 4% dodecanes, 2% tridecanes, 1% tetradecanes, 0.6% pentadecanes, 0.3% hexadecanes, 0.1% heptadecanes, 0.06% octadecanes, 0.6% benzene, 13.7% toluene, 17.9% ethyl benzene and meta- and para xylene, 2.7% ortho-xylene, 2.7% 1,2,4 trimethylbenzene, 0% cyclopentanes, 0.3% methylcyclopentane, 0.7% cyclohexane, 7% methylcyclohexane and less than 0.1% of any other constituent, including cumulatively less than 0.05% $C_{19}$+.

With a 150° C. cut, the resulting fluid, as determined by gas chromatography, has about 0% pentanes, 0.01% hexanes, 2.5% heptanes, 14.4% octanes, 9.5% nonanes, 14.1% decanes, 8.1% undecanes, 5.2% dodecanes, 3.1% tridecanes, 1.8% tetradecanes, 1% pentadecanes, 0.4% hexadecanes, 0.2% heptadecanes, 0.1% octadecanes, 0.01% benzene, 8.3% toluene, 20.3% ethyl benzene and meta- and para xylene, 3.5% ortho-xylene, 3.5% 1,2,4 trimethylbenzene, 0% cyclopentane, 0% methylcyclopentane, 0.07% cyclohexane, 3.7% methylcyclohexane and less than 0.05% of any other constituent, including cumulatively less than 0.1% $C_{19}$+.

With a 160° C. cut, the resulting fluid, as determined by gas chromatography, has about 0% pentanes, 0% hexanes, 0.2% heptanes, 7.9% octanes, 9.8% nonanes, 18.6% decanes, 10.8% undecanes, 6.9% dodecanes, 4.1% tridecanes, 2.3% tetradecanes, 1.2% pentadecanes, 0.5% hexadecanes, 0.2% heptadecanes, 0.1% octadecanes, 0% benzene, 2.2% toluene, 25.3% ethyl benzene and meta- and para xylene, 4.2% ortho-xylene, 5.0% 1,2,4 trimethylbenzene, 0% cyclopentane, 0% methylcyclopentane, 0% cyclohexane, 0.5% methylcyclohexane and less than 0.05% of any other constituent, including an undetectable amount of $C_{19}$+.

For each of the 120° C., 130° C., 140° C., 150° C. and 160° C. cuts, all percentages are mass fraction. Only simple aromatics are identified. Supercritical fluid chromatography shows that the actual aromatic content is greater than 40%. For $C_5$ to $C_{18}$, the percentage given is the sum of the peaks from the gas chromatographic analysis. Thus, the figure for "decanes" includes the figure for straight chain decane. The higher cuts show increased percentages of $C_8$ and $C_{10}$, and increased xylene, particularly the 150° C. cut. The 130° C. cut is preferred for wax and asphaltene solvation. For the 120° C. cut, the fluid is amber in colour with a density of 780 kg/m$^3$. Boiling point at 1 atm is 100–300° C., freezing point about 60° C., vapour pressure <15 kpa, with a closed cup Flash point of >10° C. As a flammable and toxic liquid, this fluid should be treated with well known safety precautions. At the higher cuts (150° C. cut), effectively all of the $C_6$ and $C_7$ is removed, with consequent increase in the xylene content to over 25%. Such a fluid is useful for pure asphaltene solvation.

Thus a preferred composition of the invention has less than 1% cumulatively of methane, ethane, propane, butane and pentane; 0 to 10% hexanes; 1 to 15% heptanes; 5 to 15% octanes; 5 to 15% nonanes; 5 to 15% decanes; 3 to 10% undecanes; 1 to 7% dodecanes; 0 to 5% tridecanes; 0 to 3% tetradecanes; 0 to 2% pentadecanes; 0 to 1% hexadecanes;

0 to 1% heptadecanes; 0 to 1% octadecanes; 0 to 3% benzene; 5 to 20% toluene; 10 to 35% xylenes; 1 to 5% 1,2,4trimethylbenzene; and cumulatively less than 2% $C_{16}$+, all of the percentages being mass fraction as determined by gas chromatography. In another preferred composition according to the invention, the fluid includes less than 5% hexanes; 0 to 15% heptanes; 0 to 15% octanes; 5 to 15% nonanes; 5 to 25% decanes; 3 to 15% undecanes; 2 to 10% dodecanes; 0 to 5% tridecanes; 0 to 3% tetradecanes; 0 to 2% pentadecanes; 0 to 1% hexadecanes; 0 to 1% heptadecanes; 0 to 1% octadecanes; 0 to 3% benzene; 5 to 15% toluene; 15 to 40% xylenes; and 1 to 8% 1,2,4trimethylbenzene.

Solvation tests using the formulation according to the invention have yielded the following results.

TABLE 3

| No. | Location | Solvent | Contaminant | % Dissolved |
|---|---|---|---|---|
| 1. | 08-20-044-04W5 | #8 | 1.0284 | 86.8 |
| 2. | 02-09-039-07 | #8 | 0.9714 | 98.2 |
| 3. | 02-20-039-07 | #8 | 0.9959 | 97.0 |
| 4. | 10-13(Viking) | #8 | 1.0033 | 87.4 |
| 5. | 06-10-035-06W4 | #8 | 1.0280 | 96.2 |
| 6. | 10-13(Viking) | #10 | 0.9972 | 63.2 |
| 7. | 06-10-035-06W4 | #10 | 0.9547 | 64.2 |
| 8. | 10-24-001-26 | #8 | 1.0005 | 71.7 |
| 9. | 8" Group Line | #8 | 1.0004 | 68.6 |
| 10. | 11-14-041-25 | #8 | 1.0017 | 76.8 |
| 11. | 08-14-041-25 | #8 | 1.0567 | 98.5 |
| 12. | 11-14-041-25 | #9 | 1.0011 | 81.1 |
| 13. | 08-14-041-25 | #9 | 0.9987 | 97.2 |
| 14. | Utikuma Keg R. | #8 | 0.9536 | 63.0 |
| 15. | Utikuma Slave | #8 | 1.0221 | 93.2 |
| 16. | Hutton 12-18 | #8 | 1.0543 | 89.2 |
| 17. | 10-18-048-08W5 | #8 | 1.1200 | 97.8 |
| 18. | 12-24-047-09W4 | #16 | 0.9756 | 99.3 |
| 19. | 12C-19-036-04 | #8 | 0.4624 | 87.3@22° C. |
| 20. | 16-01-004-21W3 | #8 | 0.2992 | 75.2@22° C. |
| 21. | Intensity Res. | #8 | 0.9845 | 97.1 |
| 22. | 05-03-055-13W5 | #8 | 0.9904 | 96.6 |
| 23. | 16-14-055-13W5 | #8 | 1.0509 | 21.4 |
| 23a. | 16-14-055-13W5 | Toluene | 1.0458 | 38.1 |
| 24. | Esso Wizard Lk. | 90/10 | 0.9813 | 98.3 |
| 25. | Esso Wizard Lk. | #8 | 0.9940 | 96.6 |
| 26. | Esso Wizard Lk. | Run 95 | 1.0018 | 91.3 |
| 27. | Esso Wizard Lk. | 90/10Xy | 0.9726 | 97.0 |
| 28. | Esso Wizard Lk. | 100Xy | 0.9676 | 96.5 |
| 29. | 16-03-040-04W5 | #8 | 1.0485 | 84.5 |
| 30. | 16-03-040-04W5 | #9 | 1.0264 | 96.1 |
| 31. | 046-09W5 Comaplex | #8 | 1.0545 | 76.1 |
| 32. | 046-09W5 Comaplex | #9 | 0.9974 | 75.6 |
| 33. | 07-11-053-26 | #8 | 1.0292 | 97.9 |
| 34a. | 16-19-071-04Chevron | #8 | 0.9756 | 94.4 |
| 34b. | 02-06-072-04Chevron | #8 | 1.0014 | 98.7 |
| 34c. | 16-19-071-04Chevron | 100Xylene | 0.9588 | 95.7 |
| 35. | 02-06-072-04Chevron | 100Xylene | 1.4169 | 93.3 |
| 36. | Chauvco Unit No. 2 | #8 | 0.9799 | 97.6 |
| 37. | 06-10-035-03W5 | #8 | 0.9548 | 66.5 |
| 38. | 08-20-026-12W4 | #8 | 1.10157 | 92.2 |
| 39. | 03-13-044-09Amoco | #8 | 1.0397 | 82.9 |
| 40. | 04-22-043-08Amoco | #8 | 0.9671 | 94.1 |
| 41. | 02-05-043-08Amoco | #8 | 1.0202 | 93.8 |
| 42. | 03-13-044-09Amoco | #9 | 0.9975 | 72.5 |
| 43. | 04-22-043-08Amoco | #9 | 0.9760 | 96.1 |
| 44. | 02-05-043-08Amoco | #9 | 1.0372 | 95.3 |
| 45. | Willesden Green | #8 | 1.0127 | 94.1 |

Notes to Table 3: Wax or asphaltene amount is listed in grams under the heading "contaminant". The origin of the sample contaminant is indicated by the location of the well, in the Province of Alberta, Canada, from which the sample was derived. % dissolved is the percentage of the original sample that was dissolved in the solvent. It is a general indicator of the effectiveness of the solvent on that particular composition of contaminant. The solvation testing procedure used to generate the data of Table 1 entailed the addition of the sample contaminant to the solvent being tested at ambient temperature, followed by stirring and chopping to maximize solvation, as a general indicator of the effectiveness of the solvent in actual well conditions. The ratio of solvent to contaminated sample was approximately 100 ml. to 1 gram. The amount of contaminated sample dissolved by the solvent was determined by filtering through a 1.5 micron filter. The amount of solvent used was 100 mL. #8 and #16 is the fluid described above as the 120° C. cut. #9 is a blend of NP760™ and 10% SUPER A SOL™, which is available from Petrolite Canada Inc. of Calgary, Alberta, Canada. SUPER A SOL™ is a blended aromatic solvent and has the appearance of a clear colorless liquid, a density of 0.791 Kg per Liter at 15° C., a flash point of 9° C., and a pour point of less than −35° C. #10 is PETRO REP™ condensate having about 15% butanes, 46% pentanes, 19% hexanes and less than 1% aromatics as determined by gas chromatography. Run 95 is 100% FRACSOL™ well site operation fluid available from Trysol Canada Ltd. of Calgary, Alberta, Canada. FRACSOL™ is an aromatic rich petroleum distillate with the following properties:

| | | |
|---|---|---|
| Aromatics | 63 | LV % |
| Reid Vapour Pressure | <1 | kPa @ 37.8 deg. C. |
| Flashpoint (PMCC) | 30 | deg. C. |
| Flashpoint (COC) | 35 | deg. C. |
| Absolute Density | 815 | kg/m3 @ 15 deg. C. |
| API Gravity | 42 | deg. C. |
| Surface Tension (Oil to Air) | 25 | dynes/cm @ 22 deg. C. |
| Interfacial Tension (Water to Oil) | 27 | dynes/cm @ 22 deg. C. |
| Cloud Point | 8 | deg. C. |
| Pour Point | −13 | deg. C |
| Aniline Point | 56 | deg. C. |

90/10 is 90% of the 120° C. cut with 10% of a non-aromatic brominated non-fluorinated hydrocarbon such as dibromomethane. 90/10Xy is 90% of the 150° C. cut described above with 10% of a non-aromatic brominated non-fluorinated hydrocarbon such as dibromomethane. 100Xy is 100% of the 150° C. cut described above. 100Xylene is pure xylene. Toluene is pure toluene. The oils from which some of the contaminants precipitated so far as known have the following composition: Sample 1. 8.26% asphaltene, 11.2% wax; Sample 4. 10% asphaltene; Sample 5. 23% asphaltene; Sample 22. 1.11% asphaltene, 4.7% wax; Sample 34c. 6.12% asphaltene, 2.9% wax; Sample 36. 3.43% asphaltene, 3.8% wax.

These results show that the formulation of the present invention provides comparable solvation properties to highly refined and expensive wax solvation products when applied to a variety of wells without specifically formulating the composition to the well formation.

By comparison with the product of the present invention, so far as known, the condensate available from other gas plants located in the Province of Alberta is not desirable for use as a wax and asphaltene removing fluid. Thus, for condensate from Amerada Hess (Bearberry), while the fluid is clear, showing low heavy ends, the aromatic content is too low by comparison with the light ends for a useful feedstock. Condensate from the Can-Oxy Mazeppa plant is dark red from the plant, which becomes black when the lighter ends are removed, that is, when a $C_7$+ cut is taken, thus indicating the presence of undesirable heavy ends. Condensate from the Burnt Timber plant has too many heavy ends to work as a solvent, but may be formation compatible in some wells. Condensate from the Brazeau plant has too few aromatics, and too many waxes to be useful as a solvent. Condensate from Mobil Oil Lone Pine Creek has 6% xylene, which might suggest it is similar to the Jumping Pound feed (6.5% xylene). However, the relative lower percentage of lighter ends means that the concentration of xylene and other aromatics does not increase greatly if the lighter ends are removed in accordance with the principles of the invention. Consequently, the feed is not very useful as a solvent. Condensate from the Husky Oil Ram River plant has too many heavy ends, as indicated by its dark colour, and has too few aromatics to make it a useful feed for a solvent.

In the method of the invention, a $C_5$+ hydrocarbon feedstock is obtained in which feedstock the mass percentage of trimethylbenzene exceeds the mass percentage of decane as determined by gas chromatography; and substantially all hydrocarbons having 1, 2, 3, 4 and 5 carbon atoms are removed, thereby producing a residual fluid, effectively a $C_7$+ fluid. The fluid is applied to a well as follows.

For pumping or flowing wells, the well should be de-waxed before attempting to clean up the formation. To clean a pumping well, an amount of the fluid of the invention equal to about one half of the tubing volume should be circulated in the well with a bottomhole pump for about 24 hours. To clean the nearby well bore formation, a squeeze volume (1.0–1.5 $m^3$ per meter of perforations) of the fluid according to the invention should be squeezed into the formation with a clean, formation compatible fluid. Preferably, the displacement fluid should be filtered to remove fines. After the fluid has been squeezed into the formation, the well should be shut in, and the fluid allowed to stand for 12 hours before putting the well back on pump.

To clean a partially plugged flowing well, a volume of the fluid according to the invention equal to one half of the tubing volume should be injected down the tubing string and allowed to soak for 24 hours. The well may then be placed back on production and tested.

To clean a completely plugged well, an attempt should be made to solubilize the plug by injecting a volume of the fluid according to the invention down the tubing string. If the plug can be solubilized, then the well should be allowed to soak for 24 hours and the well may be placed back on production and tested. If the plug cannot be solubilized, then the plug may be removed by such procedures as drilling or jetting with coiled tubing, using the fluid according to the invention as the jetting fluid. The well may then be placed back on production and evaluated.

To squeeze a flowing well in which the tubing is set in a packer, it is preferred to inject the fluid according to the invention directly through the perforations into the well bore using coiled tubing. This helps to prevent well fluid entrained solids from being re-injected into the well. If this procedure is not viable, then an attempt may be made to force the fluid according to the invention through the tubing into the formation with a clean formation compatible chase fluid. Care should be taken not to overflush the chase fluid into the formation.

To squeeze a flowing well in which the tubing is not set in a packer, it is preferred to squeeze a squeeze volume of the fluid according to the invention down the annulus to the perforations. The flowline should be kept open until the resident annulus fluid has been displaced up the tubing into the flowline. Typical squeeze volumes are 1.0–1.5 $m^3$ of the fluid according to the invention per meter of perforations. Once the fluid is in the annulus, the tubing valve may be closed and the fluid squeezed into the formation with a clean formation compatible fluid (which should not be overflushed). In either case (with or without the tubing set in a packer), the well may be shut in, allowed to soak and after 24 hours or so, placed back on production and tested.

If a flowing well does not flow after treatment, it may be desirable at that point to swab the well.

The formulation of the present invention, identified by Trisol Inc.'s tradename WAXSOL is preferably pumped into the well at below fracturing pressures. Pumping is carried out at ambient temperature. As known in the art, since the formulation of the invention is aromatic rich, contact with elastomeric components in the well should be minimized. For removal of the formulation of the invention from the well, high (maximum) pump speeds are recommended to aid in preventing the plugging of downhole pumps by release of fines and scale from downhole wax as it is dissolved.

Figure 3:
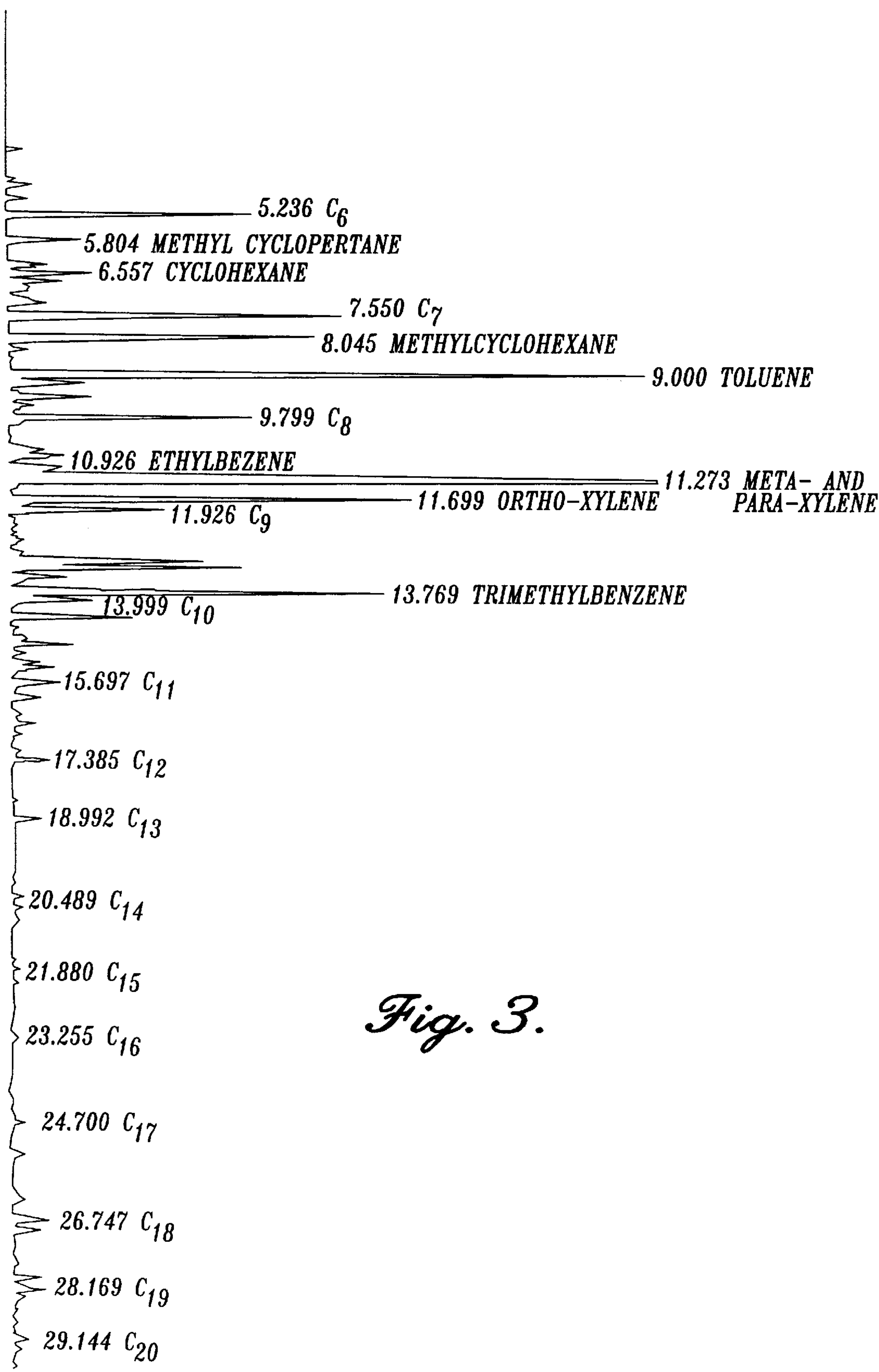
FIG. 3 is a gas chromatograph profile of a feedstock from the Shell Caroline Gas Plant in Alberta, Canada, which is an alternate preferred composition of the present invention.

An example of feedstock which fits the criteria outlined for asphaltene solvating capabilities include the condensate available at Caroline, Alberta, Canada. A gas chromatograph profile (graphic and numerical) of the feedstock is attached as FIG. 3 with the TMB peak shown at 10 and the n-decane peak shown at 12. A numerical representation of the chromatograph of FIG. 3 is presented in Table 4.

TABLE 4

SHELL CAROLINE

| Ceiling Range (C.) | PT | Component | Carbon Number % | Mol. % | Mass % | Volume |
|---|---|---|---|---|---|---|
| | −161.7 | Methane | C1 | 0.00 | 0.00 | 0.00 |
| | −88.9 | Ethane | C2 | 0.00 | 0.00 | 0.00 |
| | −42.2 | Propane | C3 | 0.00 | 0.00 | 0.00 |
| | −11.7 | iso-Butane | C4 | 0.00 | 0.00 | 0.00 |
| | −0.6 | n-Butane | C4 | 0.00 | 0.00 | 0.00 |
| | 27.8 | iso-Pentane | C5 | 0.00 | 0.00 | 0.00 |
| | 36.1 | n-Pentane | C5 | 0.00 | 0.00 | 0.00 |
| 36.1 | −68.9 | n-Hexanes | C6 | 5.16 | 3.80 | 4.52 |
| 68.9 | −98.3 | Heptanes | C7 | 8.61 | 7.38 | 8.43 |
| 98.3 | −125.6 | Octanes | C8 | 7.59 | 7.41 | 8.28 |
| 125.6 | −150.6 | Nonanes | C9 | 2.85 | 3.13 | 3.41 |
| 150-6 | −173.9 | Decanes | C10 | 8.28 | 10.08 | 10.79 |
| 173.9 | −196.1 | Undecanes | C11 | 3.88 | 5.18 | 5.48 |
| 196-1 | −215.0 | Dodecanes | C12 | 1.78 | 2.59 | 2.71 |
| 215.0 | −235.0 | Tridecanes | C13 | 0.90 | 1.42 | 1.47 |
| 235.0 | −252.0 | Tetradecanes | C14 | 0.62 | 1.05 | 1.07 |
| 252.2 | −270.6 | Pentadecanes | C15 | 0.60 | 1.09 | 1.10 |
| 270.6 | −287.8 | Hexadecanes | C16 | 0.54 | 1.05 | 1.06 |
| 287.8 | −302.8 | Heptadecanes | C17 | 0.46 | 0.95 | 0.96 |
| 302.8 | −317.2 | Octadecanes | C18 | 1.16 | 2.52 | 2.51 |
| 317.2 | −330.0 | Nonadecanes | C19 | 1.24 | 2.85 | 2.83 |
| 330.0 | −344.4 | Eicosanes | C20 | 0.19 | 0.46 | 0.46 |
| 344.4 | −357.2 | Heneicosanes | C21 | 0.03 | 0.09 | 0.08 |
| 357.2 | −369.4 | Docosanes | C22 | 0.00 | 0.01 | 0.01 |
| 369.4 | −380.0 | Tricosanes | C23 | 0.00 | 0.00 | 0.00 |
| 380.0 | −391.1 | Tetracosanes | C24 | 0.00 | 0.00 | 0.00 |
| 391.1 | −401.7 | Pentacosanes | C25 | 0.00 | 0.00 | 0.00 |
| 401.7 | −412.2 | Hexacosanes | C26 | 0.00 | 0.00 | 0.00 |
| 412.2 | −422.2 | Heptacosanes | C27 | 0.00 | 0.00 | 0.00 |
| 422.2 | −431.7 | Octacosanes | C28 | 0.00 | 0.00 | 0.00 |
| 431.7 | −441.1 | Nonacosanes | C29 | 0.00 | 0.00 | 0.00 |
| 441.1 | PLUS | Triacontanes | C30+ | 0.00 | 0.00 | 0.00 |
| | 80 | Benzene | C6H6 | 0.80 | 0.54 | 0.47 |
| | 110.6 | Toluene | C7H8 | 12.29 | 9.68 | 8.74 |
| 110.6 | −138.9 | Ethyl Benzene mtp-xylene | C8H10 | 23.19 | 21.04 | 19.04 |
| | 144.4 | o-Xylene | C8H10 | 5.85 | 5.31 | 4.67 |
| | 168.9 | 1,2,4-trimethyl-benzene | C9H12 | 5.55 | 5.70 | 5.12 |
| | 48.9 | Cyclopentane | C5H10 | 0.00 | 0.00 | 0.00 |
| | 72.2 | Methylcyclo-pentane | C6H12 | 1.45 | 1.05 | 1.09 |
| | 81.1 | Cyclohexane | C6H12 | 1.66 | 1.20 | 1.20 |
| | 101.1 | Methylcyclo-hexane | C7H14 | 5.28 | 4.43 | 4.50 |
| TOTAL | | | | 100.00 | 100.00 | 100.00 |

Only simple aromatics are quantified and listed in this table. Total aromatic content, including more complex aromatics, have been analyzed by supercritical fluid chromatography at greater than 40% mole fraction.

Figure 4:
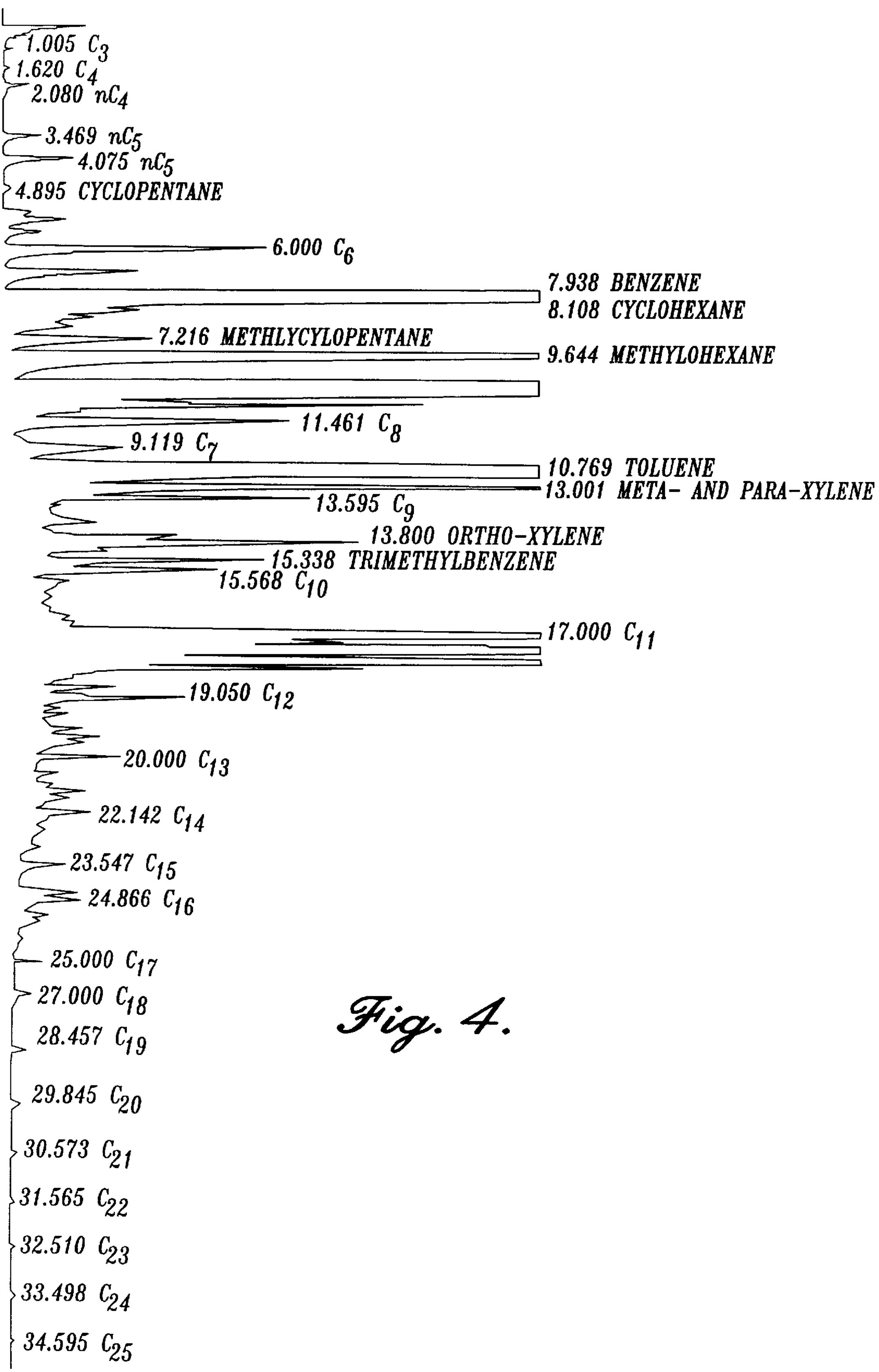
FIG. 4 is a gas chromatograph profile of a feedstock from the Hanlan Gas Plant in Alberta, Canada, which is another alternate preferred composition of the present invention.

A further example of a feedstock which fits the criteria outlined for asphaltene solvating capabilities and which may be the most preferred includes the condensate available at the Hanlan Gas Plant in Alberta, Canada. A gas chromatograph profile (graphic) of the feedstock is attached as FIG. 4 with the TMB peak shown at 10 and the n-decane shown at 12.

Obvious modifications may be made to the invention described here without departing from the essence of the invention.

The embodiments of the invention in which an exclusive property or privilege is claimed are defined as follows:

1. A method of treating oil or gas production equipment with a hydrocarbon fluid, wherein the oil or gas production equipment is contaminated with wax or asphaltene contaminants, the method comprising the steps of:

obtaining a hydrocarbon fluid that has been produced directly from an oil or gas bearing formation, the hydrocarbon fluid containing at least hydrocarbons having eight, nine, ten, eleven and twelve carbon atoms, including trimethylbenzene and n-decane, and containing a complex mixture of aromatics, in which fluid the mass percentage of trimethylbenzene exceeds the mass percentage of n-decane as determined by gas chromatography; and injecting the hydrocarbon fluid into the oil or gas production equipment to solvate contaminants in the oil or gas production equipment.

2. The method of claim 1 in which the hydrocarbon fluid includes hydrocarbons having 5 carbon atoms and further comprising the step of:

before injecting the hydrocarbon fluid into oil or gas production equipment, refining the hydrocarbon fluid to reduce $C_1$ to $C_5$ content to cumulatively less than 5% mass fraction.

3. The method of claim 1 in which the hydrocarbon fluid includes hydrocarbons having 6 carbon atoms and further comprising the step of:

before injecting the hydrocarbon fluid into oil or gas production equipment, refining the hydrocarbon fluid to reduce $C_1$ to $C_6$ content to cumulatively less than 5% mass fraction.

4. The method of claim 1 in which the hydrocarbon fluid includes hydrocarbons having 7 carbon atoms and further comprising the step of:

before injecting the hydrocarbon fluid into oil or gas production equipment, refining the hydrocarbon fluid to reduce $C_1$ to $C_7$ content to cumulatively less than 5% mass fraction.

5. The method of claim 1 in which the hydrocarbon fluid has at least 2% mass fraction hydrocarbons having more than 16 carbon atoms and the method further comprising the step of:

before applying the hydrocarbon fluid to oil or gas production equipment, refining the hydrocarbon fluid to reduce mass fraction of the hydrocarbon fluid having more than 16 carbon atoms.

6. A method of treating oil or gas production equipment with a hydrocarbon fluid, the method comprising the steps of:

obtaining a residual hydrocarbon fluid derived from a hydrocarbon feedstock that has been produced directly from an oil or gas bearing formation, the hydrocarbon feedstock and the residual hydrocarbon fluid containing at least hydrocarbons having eight, nine, ten, eleven and twelve carbon atoms, including trimethylbenzene and n-decane, and containing a complex mixture of aromatics, in which feedstock the mass percentage of trimethylbenzene is known to exceed the mass percentage of n-decane as determined by gas chromatography; and injecting the hydrocarbon fluid into the oil or gas production equipment.

7. The method of claim 6 in which the hydrocarbon fluid includes hydrocarbons having 5 carbon atoms and further comprising the step of:

before injecting the hydrocarbon fluid into oil or gas production equipment, refining the hydrocarbon fluid to remove substantially all hydrocarbons having 5 or fewer carbon atoms.

8. The method of claim 6 in which the hydrocarbon fluid includes hydrocarbons having 6 carbon atoms and further comprising the step of:

before injecting the hydrocarbon fluid into oil or gas production equipment, refining the hydrocarbon fluid to remove substantially all hydrocarbons having 6 or fewer carbon atoms.

9. The method of claim 6 in which the hydrocarbon fluid includes hydrocarbons having 7 carbon atoms and further comprising the step of:

before injecting the hydrocarbon fluid into oil or gas production equipment, refining the hydrocarbon fluid to remove substantially all hydrocarbons having 7 or fewer carbon atoms.

10. A method of treating oil or gas production equipment with a hydrocarbon fluid, wherein the oil or gas production equipment carries crude oil contaminated with asphaltenes, the method comprising the step of:

obtaining a residual hydrocarbon fluid derived from a hydrocarbon feedstock that has been produced directly from an oil or gas bearing formation, the hydrocarbon feedstock and the residual hydrocarbon fluid containing at least hydrocarbons having eight, nine, ten, eleven and twelve carbon atoms, including trimethylbenzene and n-decane, and containing a complex mixture of aromatics, in which feedstock the mass percentage of trimethylbenzene exceeds the mass percentage of n-decane as determined by gas chromatography; and injecting the hydrocarbon fluid into the oil or gas production equipment to suspend asphaltene carried by the crude oil.

11. The method of claim 10 in which the hydrocarbon feedstock includes hydrocarbons having 5 carbon atoms and further comprising the step of:

before injecting the hydrocarbon fluid into oil or gas production equipment, refining the hydrocarbon fluid to reduce $C_1$ to $C_5$ content to cumulatively less than 5% mass fraction.

12. The method of claim 10 in which the hydrocarbon feedstock includes hydrocarbons having 6 carbon atoms and further comprising the step of:

before injecting the hydrocarbon fluid into oil or gas production equipment, refining the hydrocarbon fluid to reduce $C_1$ to $C_6$ content to cumulatively less than 5% mass fraction.

13. The method of claim 10 in which the hydrocarbon feedstock includes hydrocarbons having 7 carbon atoms and further comprising the step of:

before injecting the hydrocarbon fluid into oil or gas production equipment, refining the hydrocarbon fluid to reduce $C_1$ to $C_7$ content to cumulatively less than 5% mass fraction.

14. The method of claim 10 in which the hydrocarbon feedstock has at least 2% mass fraction hydrocarbons having more than 16 carbon atoms and the method further comprising the step of:

before applying the hydrocarbon fluid to oil or gas production equipment, refining the hydrocarbon fluid to reduce mass fraction of the hydrocarbon fluid having more than 16 carbon atoms.

15. A method of treating oil or gas production equipment with a hydrocarbon fluid, wherein the oil or gas production equipment is contaminated with wax or asphaltene contaminants, the method comprising the steps of:

obtaining a residual hydrocarbon fluid derived from a hydrocarbon feedstock produced directly from an oil or gas bearing formation, the hydrocarbon feedstock containing at least hydrocarbons having eight, nine, ten, eleven and twelve carbon atoms, including trimethylbenzene and n-decane, and containing a complex mixture of aromatics, in which feedstock the mass percentage of trimethylbenzene exceeds the mass percentage of n-decane as determined by gas chromatography; and injecting the hydrocarbon fluid into the oil or gas production equipment to solvate at least 63% of the contaminants in the oil or gas production equipment.

* * * * *